(12) United States Patent
Onishi

(10) Patent No.: US 6,181,876 B1
(45) Date of Patent: Jan. 30, 2001

(54) ZOOM LENS

(75) Inventor: Hideo Onishi, Sakai (JP)

(73) Assignee: Minolta Co., Ltd., Osaka (JP)

( * ) Notice: Under 35 U.S.C. 154(b), the term of this patent shall be extended for 0 days.

(21) Appl. No.: 09/375,052

(22) Filed: Aug. 16, 1999

(30) Foreign Application Priority Data

Aug. 21, 1998 (JP) .................................................. 10-235093

(51) Int. Cl.$^7$ ............................. G03B 17/00; G03B 15/14
(52) U.S. Cl. ............................................. 396/79; 359/701
(58) Field of Search ........................ 396/79–83; 359/700, 359/701

(56) References Cited

U.S. PATENT DOCUMENTS

| | | | |
|---|---|---|---|
| 5,790,901 | 8/1998 | Nakayama et al. ..................... | 396/82 |
| 5,864,719 * | 1/1999 | Hirohata ................................ | 396/82 |
| 5,875,359 | 2/1999 | Ohtake et al. .......................... | 396/80 |
| 5,940,632 * | 8/1999 | Tsuboi ................................... | 396/80 |
| 6,028,714 * | 2/2000 | Koyama ........................... | 359/700 X |
| 6,061,524 * | 5/2000 | Uno ....................................... | 396/83 |

* cited by examiner

Primary Examiner—W. B. Perkey
(74) Attorney, Agent, or Firm—Sidley & Austin

(57) ABSTRACT

A different amount of movement is provided for the first lens unit L1 relative to the rotation angle of the drive ring 1 in at least one zoom lens section 12z–15z provided on a first cam 1d and a focus section 12f–15f corresponding to the zoom section. A different amount of movement is provided for the second lens element L2 relative to the rotation angle of the drive ring 1 in at least one zoom section 22z–25z provided on a second cam 1c and a focus section 22f–25f corresponding to the zoom section. The average inclination angle θ3 of the retracting section 10s is increased to be greater than the average inclination angle θ2 of the total section B2 excluding the retracting section 10s of the first cam 1d.

10 Claims, 3 Drawing Sheets

ZOOM LENS

This application is based on application No. 10-235093 filed in Japan, the content of which is hereby incorporated by reference.

BACKGROUND OF THE INVENTION

1. Field of the Invention

The present invention relates to a zoom lens for use in cameras and the like, and specifically relates to a zoom lens for varying the magnification at a plurality of predetermined magnifications.

2. Description of the Prior Art

The zoom lens used in cameras has a plurality of lens units, and has a zoom mechanism for arranging each lens unit at desired positions for zooming and has a focusing mechanism for arranging each lens unit at desired positions for focusing. A zoom mechanism capable of zooming at a plurality of magnifications and using the same mechanism for the focusing both simplifies construction and reduces the number of parts, and it also has the advantage of making the zoom lens more compact and reducing cost.

The construction of a conventional zoom lens for cameras having such a zoom mechanism is described below with reference to the brief section view shown in FIG. 1. As shown in the drawing, a helicoid $2a$ is formed on the interior surface of a stationary barrel 2 fixedly attached to the camera, and a helicoid $1a$ which meshes with the spiral of the helicoid $2a$ is formed on the exterior surface of a drive ring 1 which is rotatable within the stationary barrel 2.

A helicoid $1b$ is formed on the interior surface of the drive ring 1, and meshes with the spiral of a helicoid $3a$ provided on the exterior surface of a first moving frame 3 which supports a first lens unit L1, and the first moving frame 3 engages an advance guide groove $2b$ provided on the stationary barrel 2 via a connector $3b$ so as to be guided in advancement. A cam $1c$ is formed on the drive ring 1 and engages a guide pin 6 integratedly formed with a second moving frame 4 which supports a second lens unit L2, and the guide pin 6 advances in an advance guide groove $3c$ provided on the first moving frame 3.

When the drive ring 1 rotates, the drive ring 1 moves in the optical axis direction, that is, lateral direction in the drawing, via the helicoids $1a$ and $2a$. The first lens unit L1 advances in extension via the helicoids $1b$ and $3a$, and the second lens unit L2 advances in extension in accordance with the shape of the cam $1c$. The amount of the extension of the first and the second lens units L1 and L2 is the combined amount of both the movement of the drive ring 1 via the helicoids $1a$ and $2a$, and the movement of the first and the second moving frames 3 and 4 via the helicoids $1b$ and $3a$ and the cam $1c$.

A brief development view of the drive ring 1 is shown in FIG. 2; the cam $1c$ comprises three identically shaped cams $20a$, $20b$, $20c$, and three guide pins 6 are simultaneously connected. The helicoid $1b$ and the cam $1c$ are provided with retracting sections $10s$ and $20s$ to house the first and the second lens units L1 and L2 within the camera; when the camera operation is enabled, the first and the second lens units L1 and L2 are arranged near the end points e1 of the retracting sections $10s$ and $20s$. At the end points e1, the helicoid $1b$ and the cam $1c$ are formed so as to set the first and the second lens units L1 and L2 to focus at infinity at a first magnification on the most wide angle side.

The zoom section of the helicoid $1b$ (not illustrated) and the zoom sections $22z$, $23z$, $24z$, $25z$ of the cam $1c$ connect to the helicoid $3a$ and the guide pins 6 so as to move the first and the second lens units L1 and L2 and position the first and the second lens units L1 and L2 to focus at infinity at the second through fifth magnifications at the endpoints e2, e3, e4, e5 of the respective zoom sections.

When a desired magnification is selected and the first and the second lens units L1 and L2 are positioned near the endpoint of one zoom section, the distance to a photographic object is measured by a distance measuring device (not illustrated), and the first and the second lens units L1 and L2 are set at positions corresponding to the measured distance within the focus section of the helicoid $1b$ with the endpoint set as the starting point, and the focus sections $21f$, $22f$, $23f$, $24f$, $25f$ of the cam $1c$ to attain focus at the desired magnification.

According to the zoom lens of the aforesaid construction, the amount of movement of the first lens unit L1 relative to the rotational angle of the drive ring 1 is normally uniform in order that the movement of the first lens unit L1 is accomplished by the helicoids $1b$ and $3a$. As a result, when the pressure angle $\theta$ of the helicoid $1b$ is reduced to reduce the torque and improve the resolution during focusing, an area of intersection (area D in the drawing) occurs between the helicoid $1b$ and the cam $20b$. For this reason, the cam $20b$ is formed on the bottom part of the groove of the helicoid $1b$ to allow movement of the guide pin 6, thus increasing the thickness of the drive ring 1 and enlarging the zoom lens.

The endpoints (not illustrated) of the zoom sections at adjoining magnifications of the helicoid $1b$ cannot approach due to the focus section therebetween. The zoom magnification is restricted to the magnification corresponding to positions separated to some degree from each extension position of the first lens unit L1. Since the magnification changes particularly markedly with small movement of the first lens unit L1 at the wide angle side, camera operating characteristics are adversely affected inasmuch as the first through, e.g. fifth magnifications cannot be magnifications of uniform intervals.

When the amount of retraction of the lens barrel is increased to reduce the overall length of the zoom lens when housed, the retracting section $10s$ must be lengthened. Lengthening the retracting section $20s$ produces intersection of the cam $20a$, $20b$, $20c$, and complicates the structure for normal connection of the guide pins 6 corresponding to the cams $20a$, $20b$, $20c$, thereby enlarging the zoom lens.

SUMMARY OF THE INVENTION

An object of the present invention is to provide a zoom lens which is compact in size.

Another object of the present invention is to provide a zoom lens in which the thickness of the drive ring is reduced and the amount of retraction is increased.

Still another object of the present invention is to provide a zoom lens which improves resolution during focusing, improves focus precision by reducing torque, and uses low power.

To attain the above object, one aspect of the present invention comprises, a first and a second lens unit; a drive ring rotatable around an optical axis; a first cam having a plurality of zoom sections for moving the first lens unit so as to set the magnification stepwise, and having a plurality of focus sections each adjacent to the respective zoom sections for moving the first lens unit so as to focus at the set magnification; and a second cam having a plurality of zoom sections for moving the second lens unit so as to set the magnification stepwise, and having a plurality of focus sections each adjacent to the respective zoom sections for moving the second lens unit so as to focus at the set magnification;

wherein the amount of movement of the first and the second lens units relative to the rotational angle of the drive ring is different between at least one zoom section in the respective first and second cams and the focus sections corresponding to the zoom sections.

According to this construction, when the drive ring rotates, the first and the second lens units move in accordance with the shape of the first and the second cams through a zoom section of a desired magnification and are moved to a focus position within the focus section of this magnification. The amount of movement of the first lens unit relative to the rotational angle of the drive ring is different between at least one zoom section provided on the first cam and the focus section corresponding to that zoom section, and the amount of movement of the second lens unit relative to the rotational angle of the drive ring is different between at least one zoom section provided on the second cam and the focus section corresponding to that zoom section.

In one aspect, the amount of movement of the first and the second lens units per unit rotation angle of the drive ring is fixed within an optional focus section of the first and the second cams.

According to the construction, when the drive ring rotates, the first and the second lens units move in accordance with the shape of the first and the second cams through a zoom section of a desired magnification and are arranged at a focus position within the focus section of this magnification. The amount of movement of the first lens unit is fixed relative to the unit rotation angle of the drive ring within the section of each focus section provided on the cam 1, and the amount of movement of the second lens unit is fixed relative to the unit rotation angle of the drive ring within the section of each focus section provided on the second cam. Accordingly, when the first and the second cams are deployed, each focus section attains a linear shape.

In one aspect, the amount of movement of the first and the second lens units relative to the rotation angle of the drive ring is equal for all focus sections in both the first and the second cams.

According to the construction, when the drive ring rotates, the first and the second lens units move in accordance with the shape of the first and the second cams through a zoom section of a desired magnification and are arranged at a focus position within the focus section of this magnification. The amount of movement of the first lens unit is equal relative to the unit rotation angle of the drive ring in each focus section provided on the first cam, and the amount of movement of the second lens unit is equal relative to the unit rotation angle of the drive ring in each focus section provided on the second cam. Accordingly, when the first and the second cams are deployed, the angle of inclination within the focus section is identical in all focus sections of the respective cams.

In one aspect, the amount of movement of either the first lens unit or the second lens unit per unit rotational angle of the drive ring is not uniform within at least one zoom section of the first cam or the second cam.

According to the construction, when the drive ring rotates, the first and the second lens units move in accordance with the shape of the first and the second cams through a zoom section of a desired magnification and are arranged at a focus position within the focus section of this magnification. The amount of movement of either the first lens unit or the second lens unit is not uniform per unit rotation angle of the drive ring within part of a zoom section so as to avoid intersection of the first cam and the second cam. Accordingly, when the first cam and the second cam are deployed, at least one zoom section is curved.

In one aspect, the first cam has a retracting section to retract the first lens unit arranged at a farthest or infinity focus position at the predetermined magnification on the widest angle side, and the average amount of movement of the first lens unit relative to the unit rotational angle of the drive ring in the retracting section is greater than the average amount of movement of the first lens unit relative to the unit rotational angle of the drive ring in the optional focus section or the optional zoom section.

According to the construction, when the drive ring rotates, the first and the second lens units move in accordance with the shape of the first and the second cams from the retracting section through a zoom section of a desired magnification and are arranged at a focus position within the focus section of this magnification. The average amount of movement of the retracting section of the first lens unit relative to the unit rotation angle of the drive ring is greater in the optional zoom section or the optional focus section. Accordingly, when the first cam is deployed, the average angle of inclination of the retracting section is greater than the average angle of inclination of all sections excluding the retracting section.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
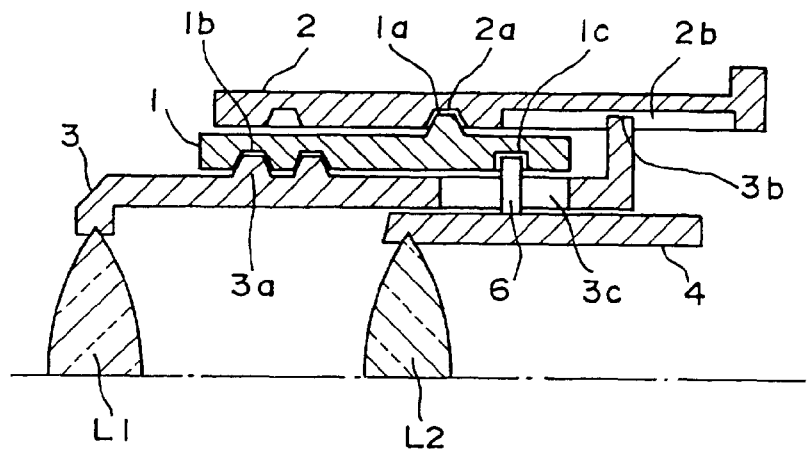
FIG. 1 shows a brief cross section view showing the construction of a conventional zoom lens.
Figure 2:
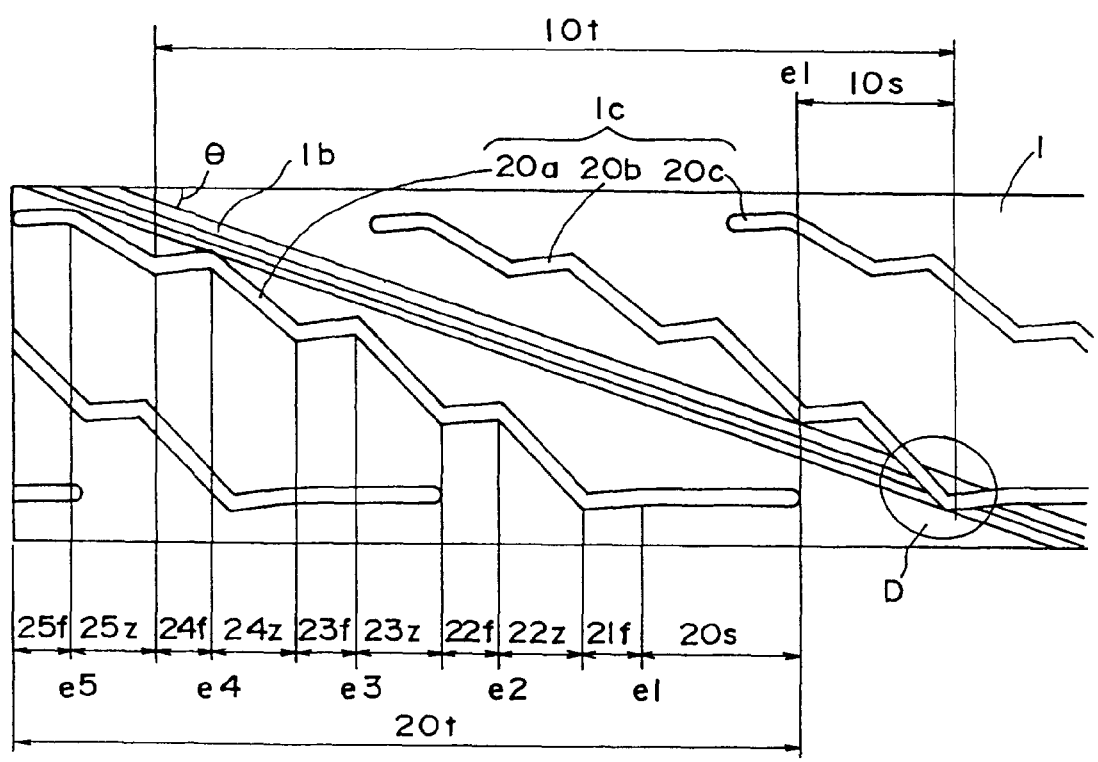
FIG. 2 shows a brief expanded view of the drive ring of a conventional zoom lens.
Figure 3:
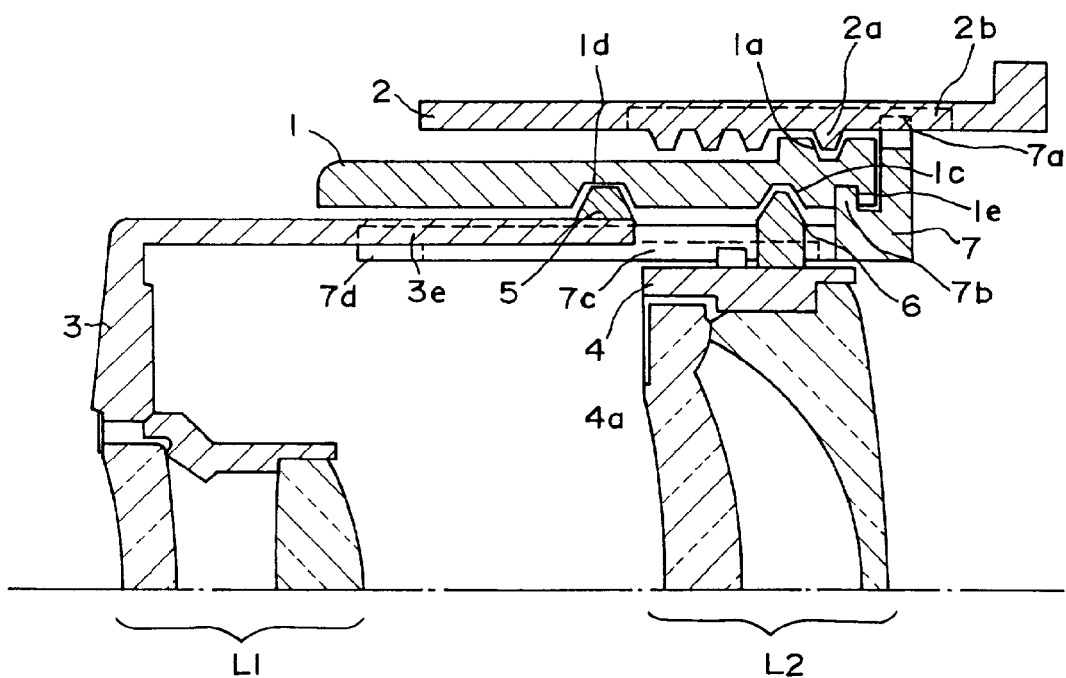
FIG. 3 shows a brief cross section view showing the construction of a zoom lens of an embodiment of the present invention.

The embodiments of the present invention are described hereinafter with reference to the accompanying drawings. For the convenience of the description, parts common with the conventional art are designated by like reference numbers. FIG. 3 is a brief cross section view showing the zoom lens of an embodiment of the present invention. To facilitate understanding, parts not in the cross section are represented by solid lines or dashed lines in the cross section.

According to this drawing, a helicoid $2a$ is formed on the interior surface of the stationary barrel 2 attached to the camera, and the guide $7a$ of the advancement barrel 7 is connected to the advancement guide groove $2b$ provided on the stationary barrel 2, such that the advancement barrel 7 can be advanced relative to the stationary barrel 2.

The drive ring 1 is connected to the support $7b$ of the advancement barrel 7 at the circular groove $1e$ and is supported so as to be rotatable, and a helicoid $1a$ is formed on the exterior surface of the drive ring 1 so as to mesh with the spiral of the helicoid 2a of the stationary barrel 2. A cam 1c is formed on the interior surface of the drive ring 1, and engages the guide pin 6 integratedly formed with the second moving frame 4 which supports the second lens unit L2, such that a protrusion 4a is guided in the advancement guide groove 7c provided on the advancement barrel 7.

A cam 1d is formed on the interior surface of the drive ring 1, and engages the guide pin 5 integratedly formed with the first moving frame 3 which supports the first lens unit L1. An advancement guide groove 3e is formed on the first moving frame 3, and an arm 7d of the advancement barrel 7 is inserted in the channel 3e so as to guide the advancement of the first moving frame 3.

When the drive ring 1 rotates, the drive ring 1 moves in the direction of the optical axis (i.e., a lateral direction in the drawing) via the helicoids 1a and 2a. The first and the second lens units L1 and L2 move in advancement so as to be extended in accordance with the shape of the cams 1d and 1c. Therefore, the amount of the extension of the first and the second lens elements L1 and L2 is the combined amount of the movement of the drive ring 1 via the helicoids 1a and 2a, and the movement of the first and the second moving frames 3 and 4 via the cams 1d and 1c.

Figure 4:
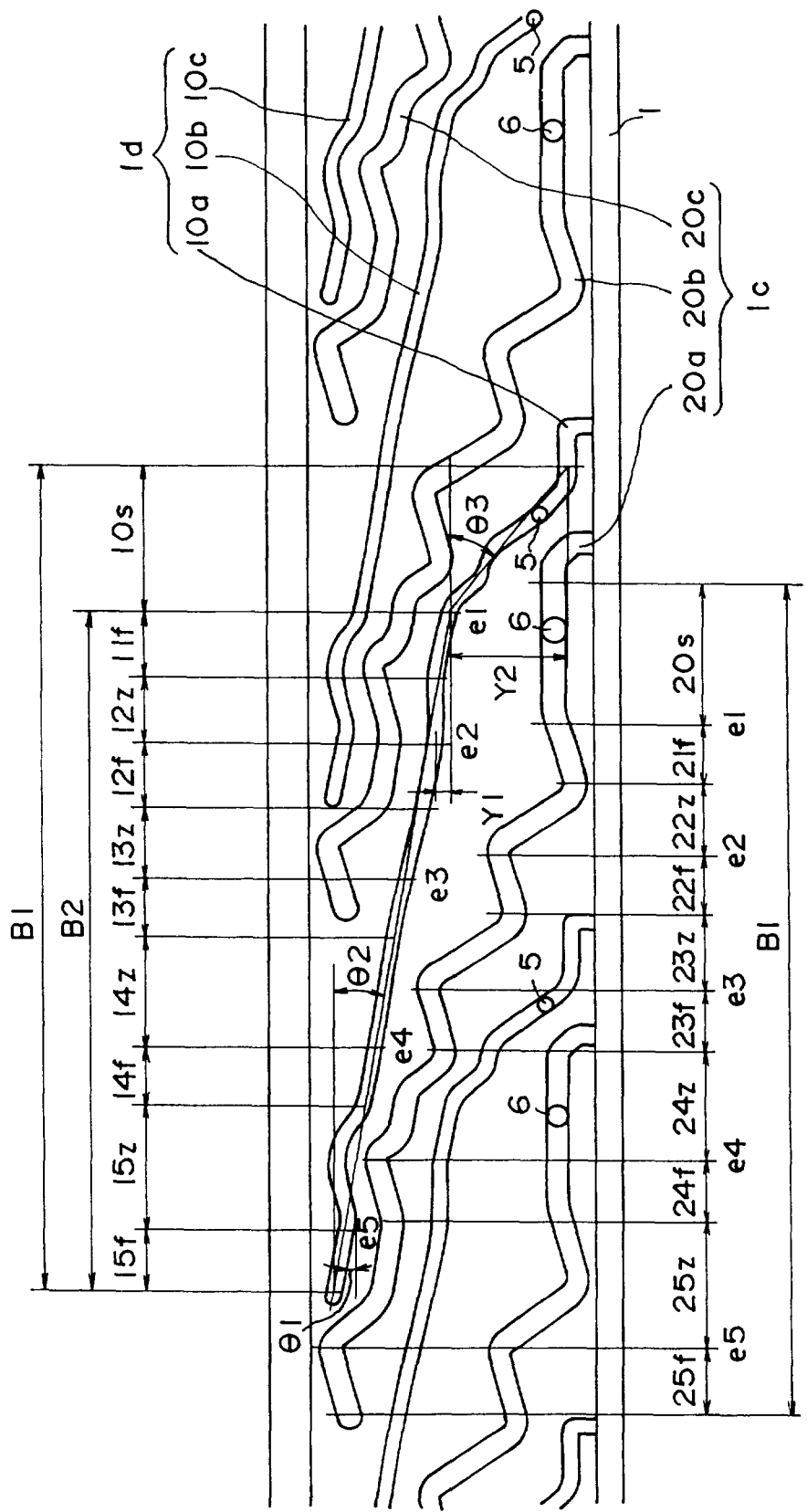
FIG. 4 shows a brief expanded view of the drive ring of a zoom lens of the embodiment.

FIG. 4 is a brief development drawing of the drive ring 1. The cams 1d and 1c respectively comprise three similarly shaped cams 10a, 10b, 10c, and 20a, 20b, 20c, and simultaneously engage three guide pins 5 and 6. The cams 1d and 1c are provided with the retracting sections 10s and 20s for housing the first and the second lens units L1 and L2 within the camera; when the camera operation is enabled by operating a power switch, the pins 5 and 6 are moved to the endpoints e1 of the retracting sections 10s and 20s, and the first and the second lens units L1 and L2 are moved to positions corresponding to the endpoints e1. The cams 1d and 1c are formed such that the first and the second lens units L1 and L2 are focused on infinity position at a first magnification on the widest angle side at the positions corresponding to the endpoints e1.

The zoom sections 12z, 13z, 14z, 15z, and 22z, 23z, 24z, 25z are connected to the guide pins 5 and 6 so as to move the first and the second lens units L1 and L2 and position the first and the second lens units L1 and L2 to focus on infinity position at the second through the fifth magnifications at the endpoints e2, e3, e4, e5 of each zoom section. If the positions of the endpoints e1 through e5 of the various zoom sections and the retracting sections 10s and 20s are the same, optional shapes may be used for the cams within the retracting sections 10s and 20s and the various zoom sections may be by optional.

When a desired magnification has been selected and the first and the second lens units L1 and L2 are positioned near the endpoint of the zoom section of the magnification, the distance to the photographic object is detected by a distance measuring device (not illustrated), and the guide pins 5 and 6 are moved to set the first and the second lens units L1 and L2 at positions corresponding to the detected distance within the focus sections 11f, 12f, 13f, 14f, 15f, and 21f, 22f, 23f, 24f, 25f with the endpoint serving as the starting point.

For example, when a zooming controller is provided to temporarily stop and sequentially move the pins 5 and 6 near the endpoints e2, e3, e4, e5 of the zoom sections, and this zooming controller is operated while the photographer looks through the view finder (not illustrated) such that the zooming is stopped near the endpoint e3, the distance to the photographic object is then detected, and the pins 5 and 6 are moved to positions corresponding to the detected distance within the focus sections 13f and 23f. As a result, the first and the second lens units L1 and L2 are moved to positions such that the photographic objects are focused at the third magnification.

In such a zoom lens, since the first lens unit L1 is moved by the cam 1d and not by a helicoid as in the conventional art, the amount of movement of the first lens unit L1 can be freely changed relative to the rotational angle of the drive ring 1. In the present embodiment, the amount of movement of the focus sections 11f, 12f, 13f, 14f, 15f is minimized relative to the rotational angle of the drive ring 1 so as to reduce the torque and improve the focus resolution, thereby improving the focus precision and enabling low power operation.

The distance of the first lens unit L1 between the endpoint e1 of the retracting section 10s and the endpoint e2 of the zoom section 12z approaches the distance Y1 by forming the zoom section 12z to have a different inclination and opposite direction to the focus section 12f. Therefore, the operational qualities of the camera are improved by setting the first through fifth magnifications to have uniform interval.

The average inclination angle θ3 of the retracting section 10s is larger than the inclination angle of an optional zoom section or an optional focus section of the cam 1d. Further, the average inclination angle θ3 of the retracting section 10s is greater than the average inclination angle θ2 of all sections B2 excluding the retracting section of the cam 1d, such that the rotational angle of the retracting section 10s is reduced and the total length B1 of the cam 1d is shortened compared to the helicoids of the conventional art. Since the cams 1c and 1d have the same rotational angle, the cam 1c at the same time has a shorter total length.

As a result, the cam 1d does not intersect the cam 1c, and a large retracting amount Y2 is ensured at a small rotation angle without increasing the thickness of the drive ring 1. Furthermore, neither do the other cams intersect since the cams 1d and 1c are curved in the zoom sections 15z and 24z, thereby also avoiding an increase in the thickness of the drive ring 1.

It is desirable that the cams 1d and 1c are linearly formed although they may be curved within each focus section when expanded, since the amount of movement of the first and the second lens units L1 and L2 is constant relative to the unit rotation angle of the drive ring 1, the amount of memory data is reduced during focusing, and a simple calculation determines the stopping position of the first and the second lens units L1 and L2, thereby simplifying the focusing control. Furthermore, it is desirable that the rotation angle θ1 is the same for all focus sections of the respective first and the second lens units L1 and L2 to simplify the focusing control.

According to the above described embodiment, since the first and the second lens units are moved by the first and the second cams, the amount of movement of both the first and the second lens units can be freely designed relative to the rotation angle of the drive ring. Accordingly, the amount of movement of the focus sections is reduced relative to the rotation angle of the drive ring so as to improve focus resolution and reduce torque, thereby improving focus precision and enabling low power operation. Since the position of the first lens unit approaches the endpoint of the zoom section at adjacent magnifications, fixed magnifications may be set at equidistances to improve the operation qualities of the camera.

Further, according to the embodiment, since the focus sections are linearly formed within the sections when the focus sections are expanded, a fixed amount of movement is obtained relative to the unit rotation angle of the drive ring so as to reduce the amount of memory data when focusing, and simplifying the calculation of the stopping positions of the first and the second lens units, thereby simplifying focus control.

Still further, according to the embodiment, the first and the second cams produce fixed amounts of movement of the first and the second lens units relative to the rotation angle of the drive ring in all focus sections, so as to produce even greater reduction of memory data during focusing and greater simplification of the calculation of the stopping positions of the first and the second lens units, thereby simplifying focus control.

Still further, according to the embodiment, the first and the second cams do not intersect because the first and the second cams are curved within the zoom section when the first and the second cams are extended, and in this way simplifying construction by reducing the thickness of the drive ring, so as to render a more compact zoom lens and a more compact camera using the zoom lens.

Still further, according to the embodiment, the average inclination angle of the retracting section is greater than the inclination angle of the optional focus section or optional zoom section of the first cam when the first cam is extended, so as to simply provide a large amount of retraction at a small rotation angle within intersection of the first and the second cams, thereby simplifying construction by reducing the thickness of the drive ring and rendering a more compact size when the zoom lens is housed.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A zoom lens comprising:
   a first and a second lens unit;
   a drive ring rotatable around an optical axis;
   a first cam having a plurality of zoom sections for moving the first lens unit so as to set the magnification stepwise, and having a plurality of focus sections each adjacent to the respective zoom sections for moving the first lens unit so as to focus at the set magnification; and
   a second cam having a plurality of zoom sections for moving the second lens unit so as to set the magnification stepwise, and having a plurality of focus sections each adjacent to the respective zoom sections for moving the second lens unit so as to focus at the set magnification;
   wherein an amount of movement of the first and the second lens units relative to the rotational angle of the drive ring is different between at least one zoom section in the respective first and second cams and the focus sections corresponding to the zoom sections.

2. A zoom lens as claimed in claim 1, wherein the amount of movement of the first and the second lens units per unit rotation angle of the drive ring is fixed within an optional focus section of the first and the second cams.

3. A zoom lens as claimed in claim 1, wherein the amount of movement of the first and the second lens units relative to the rotation angle of the drive ring is equal for all focus sections in both the first and the second cams.

4. A zoom lens as claimed in claim 1, wherein the amount of movement of either the first lens unit or the second lens unit per unit rotational angle of the drive ring is not uniform within at least one zoom section of the first cam or the second cam.

5. A zoom lens as claimed in claim 1, wherein the first cam has a retracting section to retract the first lens unit from a farthest focus position at the predetermined magnification on the widest angle side, and the average amount of movement of the first lens unit relative to the unit rotational angle of the drive ring in the retracting section is greater than the average amount of movement of the first lens unit relative to the unit rotational angle of the drive ring in the optional focus section or the optional zoom section.

6. A camera having a zoom lens comprising:
   a camera body;
   a fixed barrel which is fixed to the camera body;
   a first and a second lens unit;
   a drive ring rotatable relative to the fixed barrel;
   a first cam having a plurality of zoom sections for moving the first lens unit so as to set the magnification stepwise, and having a plurality of focus sections each adjacent to the respective zoom sections for moving the first lens unit so as to focus at the set magnification; and
   a second cam having a plurality of zoom sections for moving the second lens unit so as to set the magnification stepwise, and having a plurality of focus sections each adjacent to the respective zoom sections for moving the second lens unit so as to focus at the set magnification;
   wherein an amount of movement of the first and the second lens units relative to the rotational angle of the drive ring is different between at least one zoom section in the respective first and second cams and the focus sections corresponding to the zoom sections.

7. A camera as claimed in claim 6, wherein the amount of movement of the first and the second lens units per unit rotation angle of the drive ring is fixed within an optional focus section of the first and the second cams.

8. A camera as claimed in claim 6, wherein the amount of movement of the first and the second lens units relative to the rotation angle of the drive ring is equal for all focus sections in both the first and the second cams.

9. A camera as claimed in claims 6, wherein the amount of movement of either the first lens unit or the second lens unit per unit rotational angle of the drive ring is not uniform within at least one zoom section of the first cam or the second cam.

10. A camera as claimed in claims 6, wherein the first cam has a retracting section to retract the first lens unit from a farthest focus position at the predetermined magnification on the widest angle side, and an average amount of movement of the first lens unit relative to the unit rotational angle of the drive ring in the retracting section is greater than an average amount of movement of the first lens unit relative to the unit rotational angle of the drive ring in the optional focus section or the optional zoom section.

* * * * *